(12) United States Patent
Han et al.

(10) Patent No.: US 8,372,536 B2
(45) Date of Patent: Feb. 12, 2013

(54) BATTERY MODULE

(75) Inventors: Man-Seok Han, Suwon-si (KR);
Eui-Hwan Song, Suwon-si (KR);
Sumihito Ishida, Suwon-si (KR);
Satoshi Narukawa, Suwon-si (KR);
Jin-Kyu Hong, Suwon-si (KR); Jun-Sik Kim, Suwon-si (KR); Kyeu-Yoon Sheem, Suwon-si (KR); Tae-Keun Kim, Suwon-si (KR); Mee-Young Lee, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 406 days.

(21) Appl. No.: 12/789,707

(22) Filed: May 28, 2010

(65) Prior Publication Data

US 2011/0008670 A1    Jan. 13, 2011

(30) Foreign Application Priority Data

Jul. 10, 2009  (KR) .................. 10-2009-0063232

(51) Int. Cl.
*H01M 2/00* (2006.01)
*H01M 6/46* (2006.01)
(52) U.S. Cl. ............... 429/163; 429/153; 429/154
(58) Field of Classification Search .......... 429/151, 429/153, 154, 163, 164, 176
See application file for complete search history.

(56) References Cited

U.S. PATENT DOCUMENTS

| 6,304,057 | B1 * | 10/2001 | Hamada et al. ........... 320/107 |
| 6,946,219 | B2 | 9/2005 | Hamada et al. |
| 7,654,352 | B2 * | 2/2010 | Takasaki et al. .......... 180/68.5 |
| 8,017,264 | B2 * | 9/2011 | Hong et al. ............... 429/153 |
| 2001/0041288 | A1 * | 11/2001 | Onishi et al. .............. 429/161 |
| 2006/0166087 | A1 * | 7/2006 | Ogata et al. ............... 429/153 |
| 2007/0003830 | A1 * | 1/2007 | Bechtold et al. .......... 429/160 |

FOREIGN PATENT DOCUMENTS

| JP | 2002-141101 | 5/2002 |
| JP | 2002-231213 | 8/2002 |
| JP | 2003282043 | 10/2003 |
| JP | 2004-327172 | 11/2004 |
| JP | 2007-172943 | 7/2007 |
| KR | 10-2006-0063174 A | 6/2006 |
| KR | 10-2007-0003847 | 1/2007 |
| KR | 10-2007-0025736 A | 3/2007 |
| KR | 10-2008-0066414 A | 7/2008 |

OTHER PUBLICATIONS

Notice of Allowance dated Aug. 26, 2011 in Korean Priority Application No. 10-2009-0063232.
Notice of Allowance in co-pending Korean Patent Application No. KR 2010-056471709 dated Dec. 8, 2010.

* cited by examiner

*Primary Examiner* — Carlos Barcena
(74) *Attorney, Agent, or Firm* — Knobbe Martens Olson & Bear LLP

(57) ABSTRACT

A battery module for a rechargeable battery. The battery module has low contact resistance and includes: a plurality of electrode assemblies incorporating a positive electrode, a negative electrode and a separator disposed between the positive electrode and the negative electrode; a housing installed with the electrode assembly; and at least one conductive barrier inserted in the housing thereby dividing the space inside the housing, and electrically connecting the plurality of electrode assemblies.

15 Claims, 5 Drawing Sheets

BATTERY MODULE

CROSS-REFERENCE TO RELATED APPLICATION

This application claims the benefit of Korean Patent Application No. 10-2009-0063232, filed Jul. 10, 2009 in the Korean Intellectual Property Office, the disclosure of which is incorporated herein by reference.

BACKGROUND

1. Field

Aspects of the described technology relate to a battery module. More particularly, they relate to a battery module having at least one conductive barrier and a plurality of electrode assemblies in series.

2. Description of the Related Art

A rechargeable battery can be repeatedly charged and discharged, unlike a primary battery that cannot be recharged. Low-capacity rechargeable batteries are used for portable small-sized electronic devices, such as mobile phones, notebook computers, and camcorders. Large-capacity batteries are widely used as power sources for driving motors, such as for electric or hybrid vehicles.

Recently, high power rechargeable batteries using a high energy density non-aqueous electrolyte have been developed. A high power large-capacity rechargeable battery is configured by connecting a plurality of rechargeable batteries. A large-capacity rechargeable battery may be formed in a cylindrical shape, a prismatic shape, etc. This large capacity rechargeable battery is generally referred to as a battery module. Designed this way, the rechargeable battery can be used for devices requiring large power, for example, used for driving a motor, such as an electric or hybrid vehicle, etc.

Generally, a rechargeable battery includes a case, an electrode assembly inserted in the case, and a cap assembly closing and sealing the case and installed with a terminal. The case may be formed in a pouch shape, and may be made of a metal.

To configure the battery module to use the rechargeable batteries, a connection member for electrically connecting the terminals of the individual rechargeable batteries is installed in the battery module across the terminals. However, in the conventional rechargeable battery, the contact resistance between the respective terminals and the connection member increases and an additional connection member must be installed. Further, when there is vibration or an impact from the outside, the contact resistance between the connection member and the terminal increases further such that the overall output of the battery module decreases.

The information disclosed in this Background section is only for enhancement of understanding of the background of the invention and does not represent an admission as to the status of such a device as prior art.

SUMMARY

Aspects of the present invention configure a battery module in order to reduce contact resistance. A battery module according to an exemplary embodiment of the present invention includes: a plurality of electrode assemblies, each assembly incorporating a positive electrode, a negative electrode, and a separator disposed between the positive electrode and the negative electrode; a housing having a space in which the plurality of electrode assemblies is installed; and at least one conductive barrier inserted in the housing dividing the space inside the housing into compartments having corresponding electrode assemblies, and electrically connecting the plurality of electrode assemblies.

According to an aspect of the invention, the at least one conductive barrier is made of a laminated film including a metal layer separating non-conductive layers. According to an aspect of the invention, the at least one conductive barrier has an opening on each side of the conductive barrier where the metal layer is exposed through the non-conductive layers, and the at least one conductive barrier and adjacent electrode assemblies are electrically connected to each other in the openings using the exposed metal layer.

According to an aspect of the invention, the positive electrode or the negative electrode of each electrode assembly is bonded to an opening through welding.

According to an aspect of the invention, the positive electrode of each electrode assembly further comprises a positive electrode current collector covered by a positive active material, the negative electrode of each electrode assembly further comprises a negative electrode current collector covered by a negative active material, each electrode assembly includes a region where the electrode current collector is exposed, and the exposed region of one of the positive and negative electrodes is inserted into the opening and is welded to the metal layer.

According to an aspect of the invention, the metal layer comprises aluminum, stainless steel, other conductive metal, or alloys thereof. According to an aspect of the invention, the metal layer comprises a clad metal including aluminum and/or copper welded to the metal layer.

According to an aspect of the invention, each electrode assembly has a plurality of connection tabs electrically connected to the electrode assembly, and at least one of the connection tabs of each electrode assembly is bonded to the conductive barrier through welding.

According to an aspect of the invention, at least one electrode assembly is between an adjacent pair of conductive barriers, the positive electrode of the one electrode assembly is electrically connected to one surface of one of the pairs of adjacent conductive barriers, and the negative electrode of the one electrode assembly is electrically connected to one surface of the other one of the pair of adjacent conductive barriers. According to an aspect of the invention each electrode assembly is wound while the separator is interposed between the positive electrode and the negative electrode.

According to an aspect of the invention, each electrode assembly includes at least one region where an electrode current collector is exposed, and the at least one exposed region is formed on the end of the electrode assembly in the length direction.

According to an aspect of the invention, each electrode assembly includes at least one region where an electrode current collector is exposed, and the at least one uncoated region is formed on the end of the electrode assembly in the width direction.

According to an aspect of the invention, each exposed region includes a portion bonded with the exposed coated region of the adjacent electrode assembly through welding.

According to an aspect of the invention, each electrode assembly has a structure in which a plurality of positive electrodes, negative electrodes and separators interposed therebetween are formed in a layered fashion.

According to an aspect of the invention, the housing is made of a laminated film formed with the non-conductive layer on the surfaces of the metal layer.

According to an aspect of the invention, the battery module further comprises a sealing member installed on upper and lower side portions of the housing.

According to an aspect of the invention, the non-conductive layers are made of polymer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
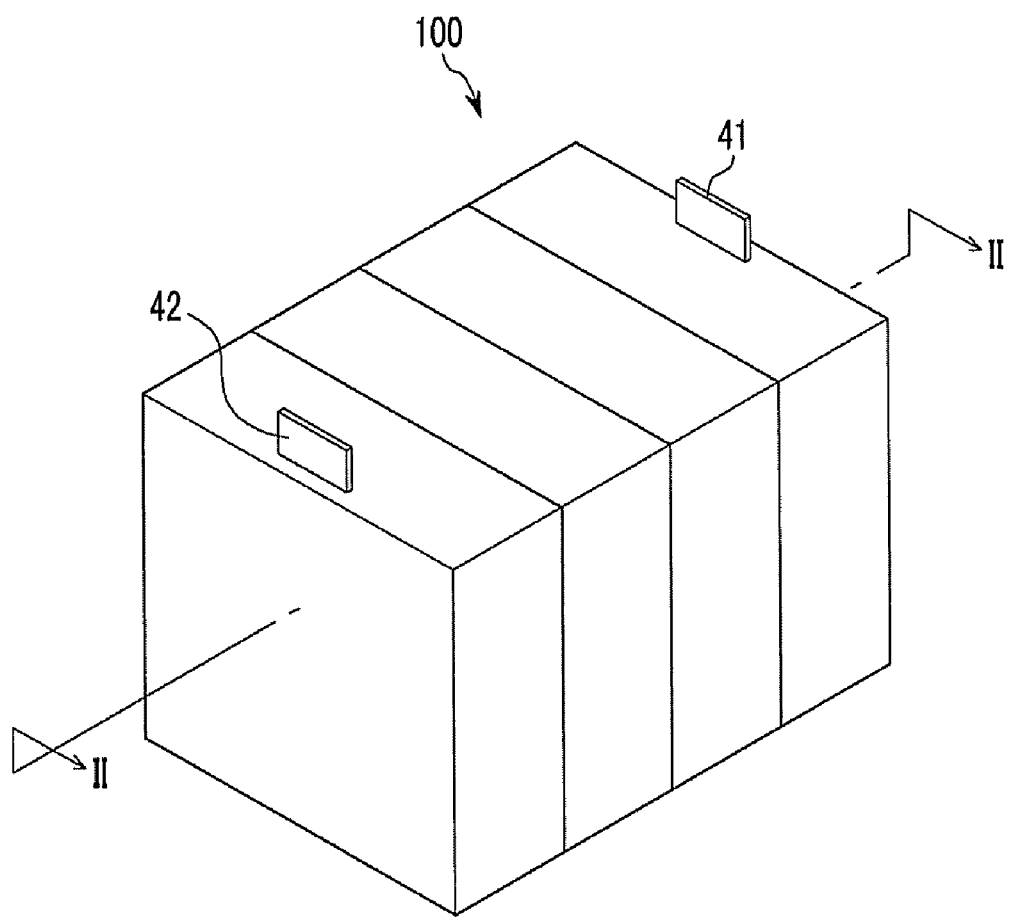
FIG. 1 is a perspective view of a battery module according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Further, the term welding can mean any joining process in which electrical connection is created or maintained between the areas welded.

Figure 2:
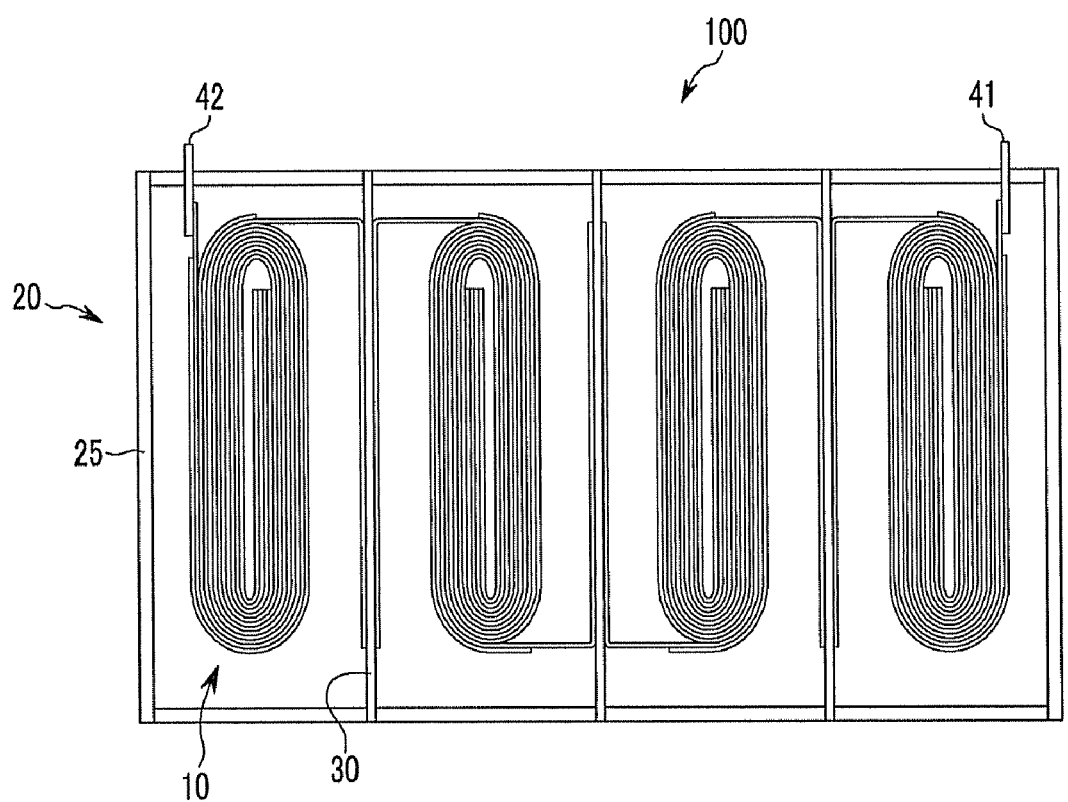
FIG. 2 is a cross-sectional view taken along the line II-II of FIG. 1.
Figure 3:
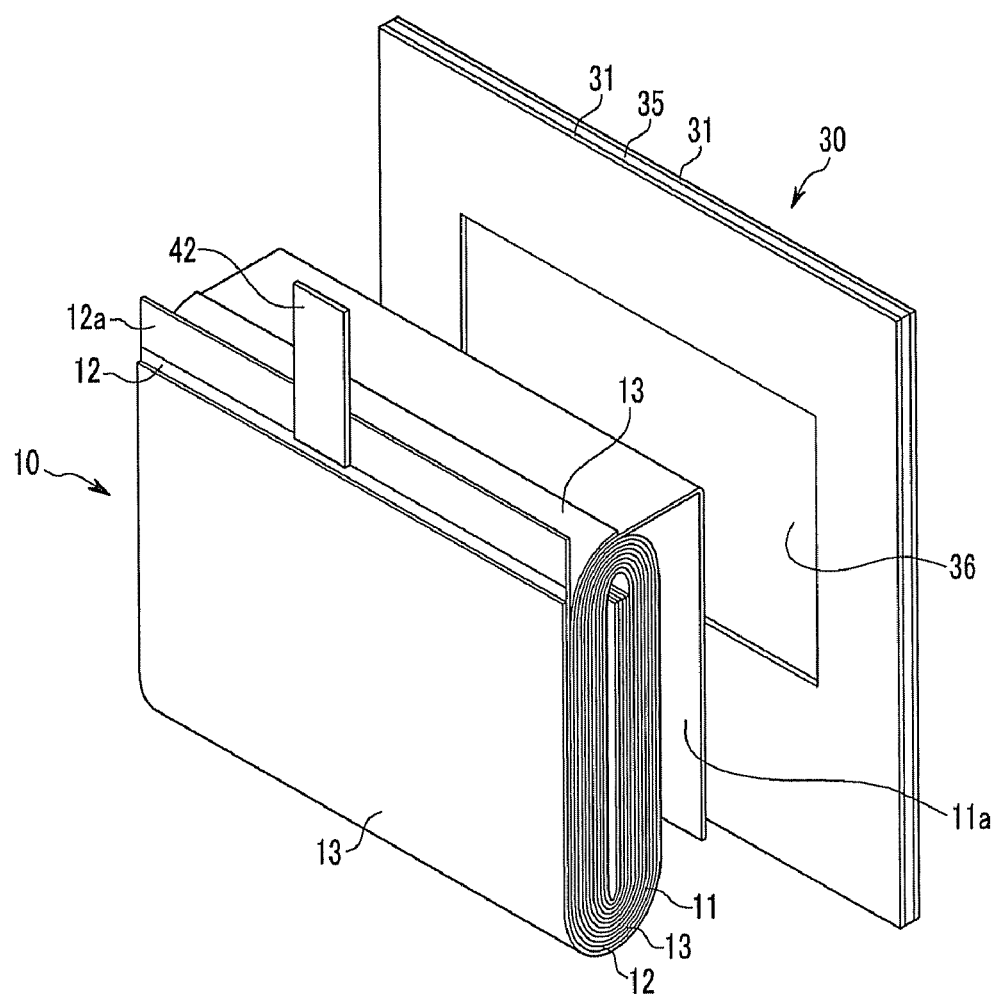
FIG. 3 is an exploded perspective view of an electrode assembly and a conductive barrier according to the exemplary embodiment of FIG. 1.

FIG. 1 is a perspective view of a battery module 100 according to an exemplary embodiment of the present invention, FIG. 2 is a cross-sectional view taken along the line II-II of FIG. 1, and FIG. 3 is an exploded perspective view of an electrode assembly and a conductive barrier according to the exemplary embodiment of FIG. 1. Referring to FIGS. 1 and 2, the battery module 100 according to this exemplary embodiment includes a housing 20, a plurality of electrode assemblies 10 inserted inside the housing and generating electricity, and a plurality of conductive barriers 30 inserted inside the housing 20. Each conductive barrier 30 divides the space inside the housing 20 and electrically connects adjacent pairs of the electrode assemblies 10, disposed on both surfaces, to each other.

Referring to FIG. 3, each conductive barrier 30 is made of a laminated film. The laminated film is made of a metal layer 35 and non-conductive layers 31 adhered to both surfaces of the metal layer 35. The metal layer 35 may be made of aluminum, stainless steel, or a clad metal where aluminum and copper are welded or connected to the metal layer 35.

Each side of the conductive barrier 30 includes an opening 36. The opening 36 is formed in an area where the non-conductive layers 31 are removed (or not formed) from each surface and the metal layer 35 is exposed. A positive electrode 11 or a negative electrode 12 of adjacent electrode assemblies 10 is adhered (through welding or otherwise) to the exposed metal layer 35 at the openings 36. In FIG. 3, openings 36 are formed in an approximately rectangular shape on both sides; however the present invention is not limited thereto, and the openings 36 may be formed in a circular or other shape and need not be the same shape on both sides of the conductive barrier 30.

The positive electrode 11 of one electrode assembly 10 is welded to one side of the conductive barrier 30, and the negative electrode 12 of another electrode assembly 10 is welded to the other side of the conductive barrier 30. As shown in FIGS. 2 and 3, the electrode assembly 10 is made of a structure in which the positive electrode 11, the negative electrode 12, and the separator 13 interposed therebetween are wound, and a plurality of electrode assemblies 10 are installed in the spaces formed by the conductive barriers 30. Accordingly, the neighboring electrode assemblies are electrically coupled in series through a conductive barrier 30.

The positive electrode 11 includes a coated region where an electrically active material is coated on a positive electrode current collector and a positive electrode uncoated region 11a where the active material is not coated on the positive electrode current collector. The positive electrode uncoated region 11a is positioned on one end of the length direction of the positive electrode 11. Also, the negative electrode 12 includes a coated region where an electrically active material is coated on a negative electrode current collector and a negative electrode uncoated region 12a where the active material is not coated on the negative electrode current collector. The negative electrode uncoated region 12a is positioned on one end of the length direction of the negative electrode 12.

The uncoated regions 11a and 12a of the positive electrode 11 and the negative electrode 12 are elongated and disposed substantially parallel to the adjacent conductive barrier 30. The uncoated regions 11a and 12a are bonded to the openings 36 of the adjacent conductive barrier 30 through welding.

The uncoated regions 11a and 12a of the positive electrode 11 or the negative electrode 12 are formed with areas corresponding to the openings 36 and are wholly inserted in the opening 36. The non-conductive layers 31 cover the portions that are not electrically connected to the uncoated regions 11a and 12a. The combination of uncoated regions 11a and 12a and the openings 36 to which they connect can be referred to as a connection portion.

In this way, if adjacent electrode assemblies 10 are bonded to a conductive barrier 30 such that the electrode assemblies 10 are electrically connected to each other through the conductive barrier 30, the contact resistance of the connection portions may be minimized, and the production cost and the weight of the battery module 100 may be reduced by designing away from unnecessary portions of the conductive barriers 30.

Also, the openings 36 are widely formed over most of the area of each conductive barrier 30, and the uncoated regions 11a and 12a that are not coated with the electrically active material are also widely formed at the edges of the respective positive electrode 11 or the negative electrode 12 such that a conductive barrier 30, and the positive electrode 11 or the negative electrode 12, may be contacted with the wide area of the openings 36 thereby further reducing the contact resistance.

Referring back to FIG. 2, the housing 20 is made of a laminated film 25. The laminated film 25 includes a metal layer disposed between non-conductive layers. The metal layer can be aluminum. The non-conductive layer may be made of a polymer such as polypropylene. If the laminated film 25 is thin, heat may be easily released from inside the housing 20 through the laminated film 25.

As shown in detail in FIGS. 2 and 3, the uncoated regions 11a and 12a of the positive electrode 11 or the negative electrode 12 of the electrode assemblies 10 disposed on the outer opposite edges of the housing 20 are attached respectively to positive and negative lead terminals 41 and 42 protruding outside the housing 20. As disclosed above, the uncoated region 11a or 12a of a positive electrode 11 or a negative electrode 12 is generally bonded to a conductive barrier 30 through welding. Here, at the opposite edges of the housing 20, the positive electrode uncoated region 11a of the electrode assembly 10 that is disposed on the edge of one side is bonded with the positive electrode lead terminal 41 through welding, and the negative electrode uncoated region 12a of the electrode assembly 10 that is disposed on the edge of the opposite side is bonded with the negative electrode lead terminal 42 through welding. Accordingly, the current of the plurality of electrode assemblies 10 that are electrically connected through the conductive barriers 30 may be transmitted to the outside through the lead terminals 41 and 42.

In the case of a large capacity battery module, it is important to reduce weight. In particular, reducing the weight is important when the battery module is installed in a moving device powered by an energy source. In the case of a battery module for a hybrid electric or electric vehicle, the weight is approximately 100 kg, and if the battery module is too heavy, the high weight causes poorer performance (such as low fuel efficiency of the vehicle). However, if the battery module 100 of the present exemplary embodiment is utilized, the weight of the battery module 100 may be significantly reduced.

Figure 4:
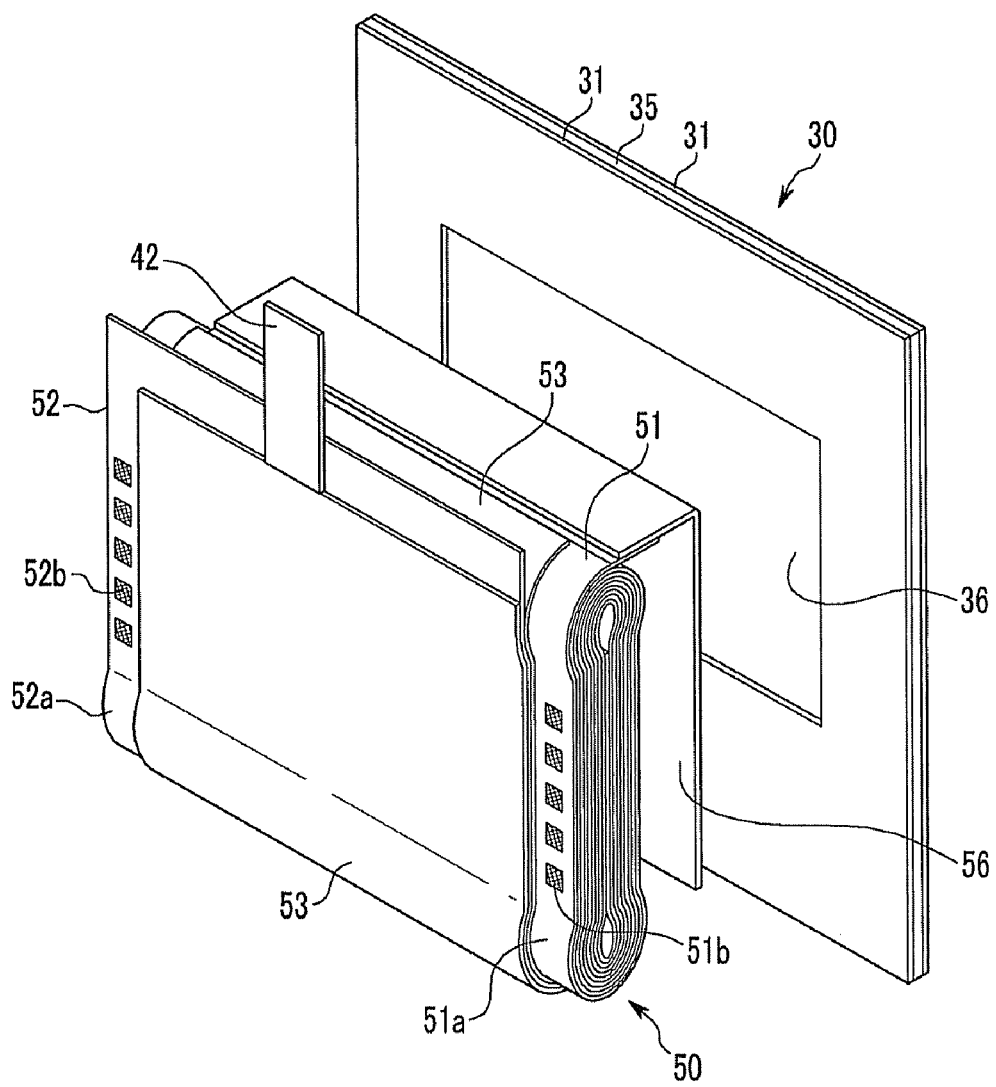
FIG. 4 is an exploded perspective view of a portion of a battery module according to another exemplary embodiment of the present invention.

FIG. 4 is an exploded perspective view of an electrode assembly 50 and conductive barrier 30 according to another exemplary embodiment of the present invention. The electrode assembly 50 and conductive barrier 30 according to the embodiment of FIG. 4 has generally the same structure as that according to the exemplary embodiment of FIGS. 1-3, except for the structure of an electrode assembly 50. Descriptions of the same structures are omitted.

Referring to FIG. 4, the electrode assembly 50 according to this exemplary embodiment is made of a structure in which a separator 53 is interposed between a positive electrode 51 and a negative electrode 52, and they are wound together. The positive electrode 51 includes a coated region where an active material is coated on a positive electrode current collector and a positive electrode uncoated region 51a where the active material is not coated on the positive electrode current collector. The positive electrode uncoated region 51a is positioned along the length direction and at the width direction of the positive electrode 51. Also, the negative electrode 52 includes a coated region where an active material is coated on the negative electrode current collector and a negative electrode uncoated region 52a where the active material is not coated on the negative electrode current collector. The negative electrode uncoated region 52a is positioned along the length direction and at the opposite end of the width direction of the negative electrode 52.

The positive electrode uncoated region 51a is formed on the end of the width direction of one side of the electrode assembly 50, and the negative electrode uncoated region 52a is formed on the end of the width direction of the other side of the electrode assembly 50. Also, the positive electrode uncoated regions 51a are welded to each other through a welded portion 51b, and the negative electrode uncoated regions 52a are welded to each other through a welded portion 52b.

Accordingly, the current to be collected to the uncoated regions 51a and 52a may be moved into the neighboring uncoated regions 51a and 52a by the shortest distance through the welded portions 51b and 52b, and then may be transmitted to the conductive barriers 30 or the lead terminals 41 and 42 without a long path. That is, if the path of the current is long, a large amount of heat is generated in the electrode assembly 50 due to resistance; however if the welding portions 51b and 52b are formed as in this exemplary embodiment, heat generation may be significantly reduced.

A connection tab 56 is installed between each positive electrode uncoated region 51a and one side of a conductive barrier 30. The connection tab 56 is welded to the positive electrode uncoated region 51a and the conductive barrier 30 such that they are electrically connected to each other. In a similar fashion, the negative electrode lead terminal 42 is bonded to the negative electrode uncoated region 52a through welding.

In this exemplary embodiment, the positive electrode uncoated region 51a is welded to the connection tab 56, however the present invention is not limited thereto, and the negative electrode uncoated region 52a may be welded to the connection tab 56 and the lead terminal 42 may be welded to the positive electrode uncoated region 51a. Alternatively, where the electrode assembly 50 is between barriers 30, each region 51a and 52a would be welded to corresponding tabs 56.

Figure 5:
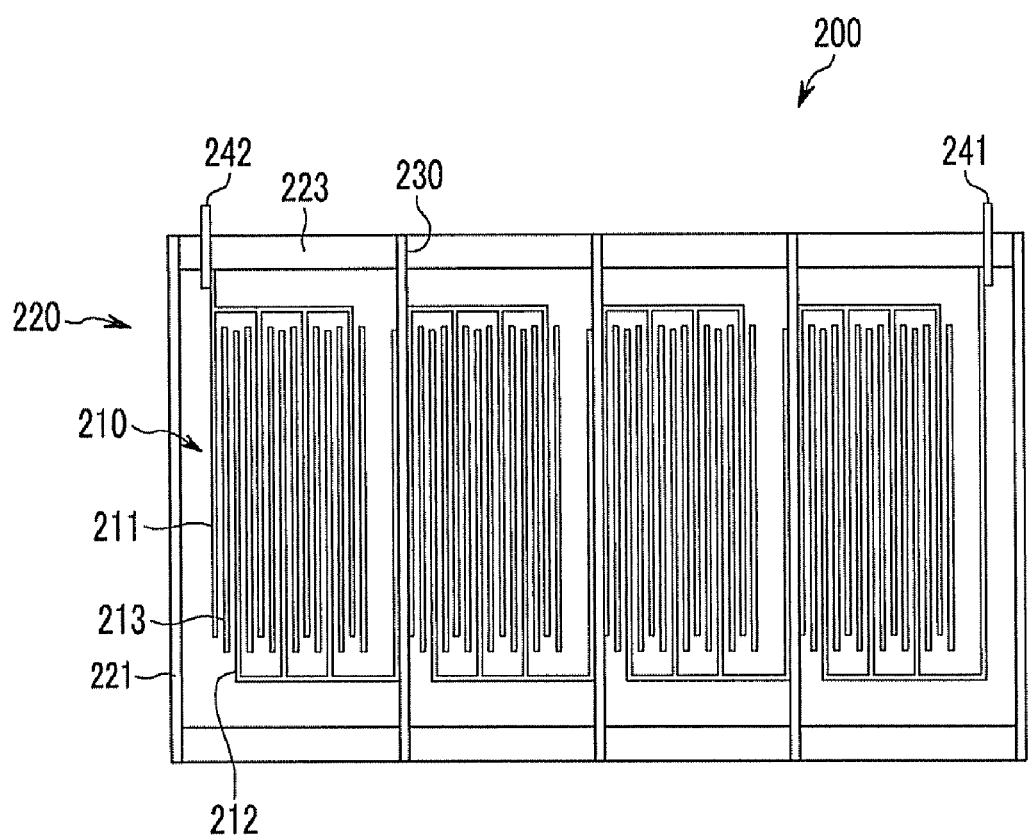
FIG. 5 is a schematic diagram of a battery module according to another exemplary embodiment of the present invention.

FIG. 5 is a schematic diagram of a battery module 200 according to another exemplary embodiment of the present invention. Referring to FIG. 5, the battery module 200 includes a housing 220. A plurality of electrode assemblies 210 is inserted inside the housing 200 and generating electricity. Conductive barriers 230 are inserted inside the housing 220 thereby dividing the space inside the housing 220 and electrically connecting the electrode assemblies 210 disposed on both surfaces to each other.

Each conductive barrier 230 is made of a laminated film. The laminated film includes a metal layer separating non-conductive layers adhered to both surfaces of the metal layer. In each conductive barrier 230, openings are formed on opposite sides by removing the non-conductive layer on both surfaces (or not forming a non-conductive layer over the opening area), and the positive electrode 211 and the negative electrode 212 of adjacent electrode assemblies 210 are bonded to the opening through welding.

The electrode assembly 210 is formed of a structure in which a separator 213 is interposed between each positive electrode 211 and each negative electrode 212. The separators 213 are interposed between a plurality of positive electrodes 211 and a plurality of negative electrodes 212 are formed in a layered fashion. Here, the positive electrodes 211, the negative electrodes 212, and the separators 213 have the same plane shape, and the plurality of electrode assemblies 210 is inserted and installed in the spaces formed by the at least one conductive barrier 230.

In similar fashion to the previous embodiments described in FIGS. 1 through 4, the positive electrodes 211 and the negative electrodes 212 are welded to conductive barriers 230 such that the electrode assemblies 210 are electrically connected to each other in series, and the lead terminals 241 and 242 are adhered to the electrode assemblies 210 disposed on the opposite edges of the battery module 200.

The housing 220 is made of the laminated film 221 of aluminum disposed between non-conductive layers. The laminated film 221 is installed as the sides of the housing 220. A sealing member 223 made of a polymer or other non-conductive material for sealing is installed on the upper and lower portions of the battery module 200. The sealing member 223 is melted and adhered to the laminated film 221, thereby sealing the housing 220.

Other embodiments not described in detail can be equivalent. For example, as cited above, electrical connections can be created or maintained by techniques other than welding. Also, as cited above, a non-conductive layer shaped to create a designed opening can be bonded to the metal layer metal layer of a conductive barrier rather than bonding a non-conductive layer over the conductive barrier and than removing material to form an opening. Further, a variety of materials can be used as non-conductive layers or sealing members, and a variety of conductive metals can be used other than stainless steel, copper or aluminum. In addition, electrode assemblies can be formed in ways other than a jelly roll (e.g., wound positive electrode, separator and negative electrode) or layered.

According to exemplary embodiments of the present invention, the plurality of electrode assemblies is electrically connected through the conductive barrier, and thereby the contact resistance may be reduced. Also, the weight of the battery module may be reduced.

In addition, although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery module comprising:
a plurality of electrode assemblies, each assembly incorporating a positive electrode, a negative electrode, and a separator disposed between the positive electrode and the negative electrode;
a housing having a space in which the plurality of electrode assemblies is installed; and
at least one conductive barrier inserted in the housing dividing the space inside the housing into compartments having corresponding electrode assemblies, and electrically connecting the plurality of electrode assemblies, wherein the at least one conductive barrier is made of a laminated film including a metal layer separating non-conductive layers, wherein the at least one conductive barrier has an opening on each side of the conductive barrier where the metal layer is exposed through the non-conductive layers, and the at least one conductive barrier and adjacent electrode assemblies are electrically connected to each other in the opening using the exposed metal layer.

2. The battery module of claim 1, wherein the positive electrode or the negative electrode of each electrode assembly is bonded to an opening through welding.

3. The battery module of claim 1, wherein:
the positive electrode of each electrode assembly further comprises a positive electrode current collector covered by a positive active material,
the negative electrode of each electrode assembly further comprises a negative electrode current collector covered by a negative active material,
each electrode assembly includes a region where the electrode current collector is exposed, and
the exposed region of one of the positive and negative electrodes is inserted into the opening and is welded to the metal layer.

4. The battery module of claim 1, wherein the metal layer comprises aluminum, stainless steel, other conductive metal, or alloys thereof.

5. The battery module of claim 1, wherein the metal layer comprises a clad metal including aluminum and/or copper are welded to the metal layer.

6. The battery module of claim 1, wherein the non-conductive layers are made of polymer.

7. The battery module of claim 1, wherein:
each electrode assembly has a plurality of connection tabs electrically connected to the electrode assembly, and
at least one of the connection tabs of each electrode assembly is bonded to the conductive barrier through welding.

8. The battery module of claim 1, wherein:
at least one electrode assembly is between an adjacent pair of conductive barriers,
the positive electrode of the one electrode assembly is electrically connected to one surface of one of the pairs of adjacent conductive barriers, and
the negative electrode of the one electrode assembly is electrically connected to one surface of the other one of the pair of adjacent conductive barriers.

9. The battery module of claim 1, wherein each electrode assembly is wound while the separator is interposed between the positive electrode and the negative electrode.

10. The battery module of claim 9, wherein:
each electrode assembly includes at least one region where an electrode current collector is exposed, and
the at least one exposed region is formed on the end of the electrode assembly in the length direction.

11. The battery module of claim 9, wherein:
each electrode assembly includes at least one region where an electrode current collector is exposed, and
the at least one uncoated region is formed on the end of the electrode assembly in the width direction.

12. The battery module of claim 11, wherein each exposed region includes a portion bonded with the exposed coated region of the adjacent electrode assembly through welding.

13. The battery module of claim 1, wherein each electrode assembly has a structure in which a plurality of positive electrodes, negative electrodes and separators interposed therebetween are formed in a layered fashion.

14. The battery module of claim 1, wherein the housing is made of a laminated film formed with the non-conductive layer on the surfaces of the metal layer.

15. The battery module of claim 14, further comprising a sealing member installed on upper and lower side portions of the housing.

* * * * *

UNITED STATES PATENT AND TRADEMARK OFFICE
CERTIFICATE OF CORRECTION

PATENT NO. : 8,372,536 B2  
APPLICATION NO. : 12/789707  
DATED : February 12, 2013  
INVENTOR(S) : Han et al.

Page 1 of 1

It is certified that error appears in the above-identified patent and that said Letters Patent is hereby corrected as shown below:

In the Specification

In column 7 at line 7 (approx.), Change "than" to --then--.

Signed and Sealed this
Seventeenth Day of September, 2013

Teresa Stanek Rea
*Deputy Director of the United States Patent and Trademark Office*